US008836475B2

(12) United States Patent
Donlan et al.

(10) Patent No.: US 8,836,475 B2
(45) Date of Patent: Sep. 16, 2014

(54) MONITORING UNIT CONFIGURATION MANAGEMENT

(75) Inventors: Brian Donlan, Southport, FL (US); Michael Baumgartner, Panama City, FL (US); Norayr Minassian, Cupertino, CA (US); Timothy Hester, Panama City, FL (US)

(73) Assignee: Cubic Corporation, San Diego, CA (US)

( * ) Notice: Subject to any disclaimer, the term of this patent is extended or adjusted under 35 U.S.C. 154(b) by 205 days.

(21) Appl. No.: 13/088,803

(22) Filed: Apr. 18, 2011

(65) Prior Publication Data

US 2012/0262272 A1 Oct. 18, 2012

(51) Int. Cl.

| | |
|---|---|
| ***G05B 19/00*** | (2006.01) |
| ***G07C 5/00*** | (2006.01) |
| ***G07C 9/00*** | (2006.01) |

(52) U.S. Cl.

CPC ............ *G07C 9/00571* (2013.01); *G07C 5/008* (2013.01)

USPC ......... 340/5.61; 340/5.25; 340/5.64; 340/5.8; 340/10.1; 340/539.22; 340/545.6; 340/572.1; 455/567; 455/575.8; 235/383; 235/487; 701/33.4; 705/28

(58) Field of Classification Search

USPC .................. 340/5.25, 5.8, 10.1, 545.6, 572.1; 235/383, 487; 455/567, 575.8; 705/28; 701/33.4

See application file for complete search history.

(56) References Cited

U.S. PATENT DOCUMENTS

| | | | | |
|---|---|---|---|---|
| 6,522,240 | B1 * | 2/2003 | Weiss et al. | 340/5.25 |
| 7,394,363 | B1 * | 7/2008 | Ghahramani | 340/539.22 |
| 7,762,457 | B2 * | 7/2010 | Bonalle et al. | 235/383 |
| 7,889,052 | B2 * | 2/2011 | Berardi et al. | 340/5.8 |
| 8,074,889 | B2 * | 12/2011 | Beenau et al. | 235/487 |
| 8,279,067 | B2 * | 10/2012 | Berger et al. | 340/572.1 |
| 8,290,552 | B2 * | 10/2012 | White | 455/575.8 |
| 8,392,296 | B2 * | 3/2013 | Powers et al. | 705/28 |
| 2007/0188299 | A1 * | 8/2007 | Blum | 340/5.25 |
| 2007/0293275 | A1 * | 12/2007 | Kalinichenko et al. | 455/567 |
| 2008/0147268 | A1 * | 6/2008 | Fuller | 701/35 |
| 2009/0102652 | A1 * | 4/2009 | Diener et al. | 340/545.6 |
| 2010/0253519 | A1 * | 10/2010 | Brackmann et al. | 340/572.1 |
| 2010/0283575 | A1 | 11/2010 | Tubb et al. | |
| 2010/0328031 | A1 * | 12/2010 | Powers et al. | 340/5.64 |
| 2012/0235791 | A1 * | 9/2012 | Donlan et al. | 340/10.1 |

* cited by examiner

*Primary Examiner* — Daniel Wu
*Assistant Examiner* — Israel Daramola
(74) *Attorney, Agent, or Firm* — Kilpatrick Townsend & Stockton LLP

(57) ABSTRACT

A monitoring device in accordance with the disclosure stores a serial number list in non-volatile memory, the serial number list including data indicative of at least one valid serial number associated with one or more key fobs permitted to interact with the monitoring device. The monitoring device is configured to receive a wakeup signal via a key fob interface configured to communicate with a key fob. The monitoring device reads a serial number from a key fob via the key fob interface and searches the stored serial number list for data indicative of a valid serial number matching the serial number read via the key fob interface. The monitoring device reads action data from the key fob via the key fob interface, the action data being indicative of an action to be taken by the monitoring device. The monitoring device, in response to the read serial number matching a valid serial number of the stored serial number list, takes an action based on the action data.

18 Claims, 7 Drawing Sheets

MONITORING UNIT CONFIGURATION MANAGEMENT

BACKGROUND OF THE INVENTION

Global trade is one of the fastest growing portions of the global economy. More countries than ever are importing and exporting more products than ever before. The vast majority of products are shipped in one or more types of cargo containers. About 90% of the world's trade is transported in cargo containers. Containers include ISO (International Organization of Standardization) containers, shipped by ship or train, and truck containers.

Cargo containers can contain valuable products that are easy targets for thieves. Cargo containers can also contain dangerous products that could be used for evil purposes if allowed to fall into the wrong hands. Terrorists, for example, could use a cargo container to transport explosives, or radiological material in order to attempt to disrupt the economic infrastructure of developed countries. The vulnerability of international shipping has been the focus of a program known as the Container Security Initiative (CSI) that was launched in 2002 by the U.S. Bureau of Customs and Border Protection (CBP).

CSI addresses the security concerns of shipping by focusing on four main areas. The four main areas addressed by CSI include:

- Using intelligence and automated information to identify and target containers that pose a risk for terrorism.
- Pre-screening those containers that pose a risk at the port of departure before they arrive at U.S. ports.
- Using detection technology to quickly pre-screen containers that pose a risk.
- Using smarter, tamper-evident containers.

Container/cargo monitoring devices are used to monitor various conditions associated with containers or other cargo. Monitoring devices can be reconfigured via various methods including wireless communications. Authentication of individuals desiring to reconfigure a monitoring device provides for more secure transportation of the associated containers. Techniques described herein provide for secure configuration management of monitoring devices associated with containers or other cargo. However, by being field reconfigurable, monitoring devices can be more susceptible to hijackings, theft and/or terrorism. What is needed is a secure way of initiating a reconfiguration of a container/cargo monitoring device in the field.

SUMMARY

The ensuing description provides preferred exemplary embodiment(s) only, and is not intended to limit the scope, applicability or configuration of the disclosure. Rather, the ensuing description of the preferred exemplary embodiment(s) will provide those skilled in the art with an enabling description for implementing a preferred exemplary embodiment. It being understood that various changes may be made in the function and arrangement of elements without departing from the spirit and scope as set forth in the appended claims.

A monitoring device for monitoring a container or other cargo in accordance with the disclosure includes a key fob interface configured to communicate with a key fob, a wireless interface, a memory storing a serial number list, the serial number list including data indicative of at least one valid serial number associated with one or more key fobs permitted to interact with the monitoring device, and a processing unit coupled to the key fob interface, the wireless interface and the memory. The processing unit is configured to: receive a wakeup signal via the key fob interface, read a serial number from a key fob via the key fob interface, search the serial number list for data indicative of a valid serial number matching the serial number read via the key fob interface, read action data from the key fob via the key fob interface, the action data being indicative of an action to be taken by the processing unit, and in response to the read serial number matching a valid serial number of the serial number list, cause the monitoring device to take an action based on the action data.

A method of operating a monitoring device for monitoring a container or other cargo in accordance with the disclosure includes: storing a serial number list in non-volatile memory, the serial number list including data indicative of at least one valid serial number associated with one or more key fobs permitted to interact with the monitoring device, and receiving a wakeup signal via a key fob interface configured to communicate with a key fob. The method further includes reading a serial number from a key fob via the key fob interface, searching the stored serial number list for data indicative of a valid serial number matching the serial number read via the key fob interface, reading action data from the key fob via the key fob interface, the action data being indicative of an action to be taken by the monitoring, and in response to the read serial number matching a valid serial number of the stored serial number list, causing the monitoring device to take an action based on the action data.

Items and/or techniques described herein may provide one or more of the following capabilities. The key fob includes a unique serial number that the container/cargo monitoring device can query before interacting further with the key fob, e.g., taking any action associated with action data stored on the key fob. Different key fobs can store data associated with different actions to be taken by the monitoring device. The key fobs can be distributed to people in a hierarchical manner such that fewer key fobs, and therefore fewer people, can cause the container/cargo monitoring device to take more crucial actions, such as powering down, for example. The container/cargo monitoring device can store a list of valid and/or invalid serial numbers to determine which key fobs can or cannot cause the container/cargo monitoring device to take action. The list of valid and/or invalid serial numbers can vary, depending on a location of the monitoring device, a time of day, and/or a mode of transportation with which a container or other cargo the container/cargo monitoring device is coupled to is being transported. The serial number list can be changed during transport in response to several factors to add or remove serial numbers from valid and/or invalid lists.

Figure 1A:
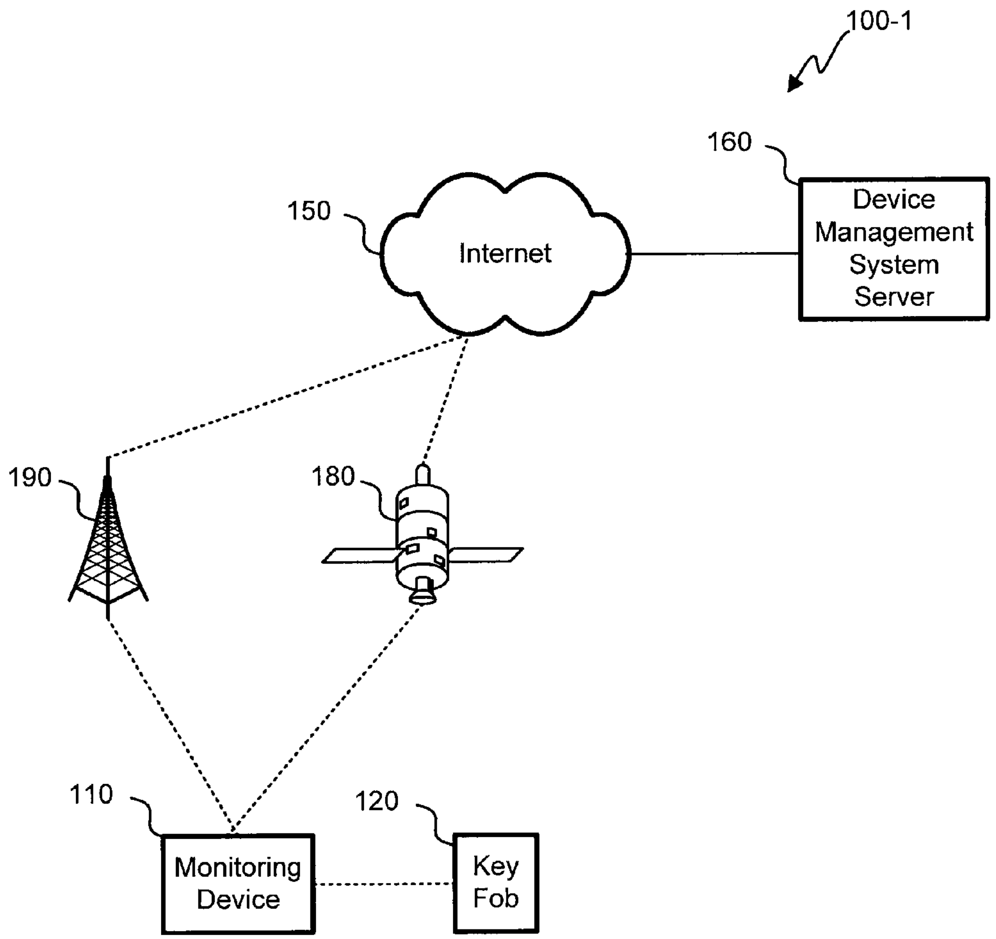
FIG. 1A is a block diagram of an embodiment of a wireless network for communicating configuration management data to a container/cargo monitoring device from a central device management system (DMS).

The features, objects, and advantages of embodiments of the disclosure will become more apparent from the detailed description set forth below when taken in conjunction with the drawings. In the drawings, like elements bear like reference labels. Various components of the same type may be distinguished by following the reference label with a dash and a second label that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments. It will be apparent, however, to one skilled in the art that various embodiments may be practiced without some of these specific details. In other instances, well-known structures and devices are shown in block diagram form.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the disclosed systems and methods as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

Monitoring devices described herein may be configured in a variety of ways, in a variety of contexts. By being reconfigurable in the field, e.g., when coupled to and monitoring a shipping container or other cargo, actions performed by monitoring devices can be modified to suit the ever changing conditions where the monitoring devices are located. For example, a destination of a monitoring device can be modified, additional sensors can be added to a communications network that the monitoring device is coupled with, etc. Sensors can provide information to the monitoring device, e.g., via wired or wireless communications. The sensor information can include data from a variety of sensors, which can indicate the temperature and/or humidity of a container, whether the container door is or has been opened, whether the container or cargo is experiencing or has experienced a shock, the location of the monitoring device, whether the monitoring device is moving, and more.

Monitoring devices can be reconfigured in the field using a mobile processing unit such as a personal digital assistant (PDA), a laptop computer, a smart phone, etc. However, some locations may be inhospitable to these mobile processing units. For example, if a monitoring device is located in an area with rugged climate or conditions, e.g., in a desert, in a blizzard, in a hurricane, in a war zone, or another inhospitable location, mobile processing units can be susceptible to malfunction.

A wired or wireless key fob device can be used to cause a monitoring device to take certain actions without requiring the use of more complex mobile processing units such as a personal digital assistant, tablet computer or mobile phone. The key fob can be inexpensive and more durable than the more complex mobile processing units.

Examples of monitoring devices in accordance with the disclosure provide a key fob interface for communicating with a key fob. The key fob interface can be a wired or wireless connection. A wired key fob interface can be a two contact interface comprising a ground contact and a data contact configured to contact the "lid" of a key fob such as, for example, an iButton® (a product of Maxim Integrated Products and Dallas Semiconductor). A wireless key fob interface could be an RFID interface, a smartcard interface, etc.

The key fobs are loaded with a unique serial number. The serial number is unique to a single key fob. The unique fob serial number is usually pre-loaded at the fob manufacturer's factory and is not changeable. The monitoring device stores a list of serial numbers associated with the serial numbers of key fobs. The serial number list of the monitoring device can include serial numbers associated with valid key fobs that are permitted to interact with the monitoring device. The serial number list can also include serial numbers associated with key fobs that are not permitted to interact with the monitoring device. The serial number list can include location information that limits the valid devices to specific locations. For example, a customs official could be issued a key fob that is listed as a valid key fob only when the monitoring device is located in an area controlled by the customs organization, e.g., a border crossing or port of entry. The monitoring device serial number list can be updated from a remote location via a wireless signal, e.g., mobile telephone and/or satellite communications.

The key fobs can also be loaded with data indicative of actions to be taken by the monitoring device after the monitoring device verifies that the key fob is a valid key fob. The actions data can cause the monitoring device to perform various actions as described below. The monitoring device communicates serial numbers and actions taken in response to interactions with the key fob to a remote device management system (DMS). The DMS can determine whether the actions have been caused by a valid key fob based on the data communicated by the monitoring device. The DMS can also update the serial number list on the monitoring device. For example, if a key fob is reported as being lost or stolen, the DMS can communicate a message to the monitoring device that rescinds the serial number of the lost key fob from the valid serial number list.

FIG. 1A is a block diagram of an embodiment of a configuration management system 100-1. In this embodiment, a monitoring device 110 communicates with a DMS server 160. The monitoring device 110 communicates sensor data and messages associated with configuration management to the DMS server 160. A monitoring device 110 gathering sensor information can communicate the sensor information and messages related to configuration management toward the DMS server 160 using a satellite system 180, or a mobile telephone system 190 in conjunction with the Internet 150.

The monitoring device 110 communicates with a key fob 120. The communication between the monitoring device 110 and the key fob 120 can be wired or wireless. The key fob 120 stores a serial number that is communicated to the monitoring device 110. The monitoring device 110 verifies that the key fob 120 is permitted to interact with the monitoring device 110 by searching a list of serial numbers stored in the monitoring device 110. The DMS server 160 can provide valid and invalid serial numbers to be included in the serial number list via the Internet 150 and/or the satellite system 180 or the mobile telephone system 190. The key fob 120 also stores action data. If the key fob 120 is verified by the monitoring device 110 to be a valid key fob, the action data is read from the key fob 110 by the monitoring device 110 and the monitoring device 110 performs actions associated with the action data.

The DMS server 160 provides an interface with the monitoring device 110 that can be used by a human user or another system, by utilizing, for example, a graphical user interface (GUI) and/or an application programmable interface (API). The DMS server 160 can collect and store information from the monitoring device 110. The data communicated between the DMS server 160 and the monitoring device 110 can be securely communicated in encrypted packets, and the DMS server 160 can provide secure management of the collected data.

One or more of a variety of physical layers may be used to provide the wireless connections between the monitoring device 110 and the satellite or mobile telephone systems 180 and 190 (and optionally the key fob 120). The monitoring device 110 can communicate wirelessly using a protocol stack based on IEEE 802.15.4 standard at 2.4 GHz using all 16 channels available in that standard. Other wireless technologies may be used, including IEEE 802.15.4 at 900 MHz; IEEE 802.11; Bluetooth®; IEEE 802.16; Ultra Wideband (UWB); 433 MHz Industrial, Scientific, and Medical (ISM) Band; cellular; optical; and more, using multiple RF channels (e.g., narrow-band frequency hopping) or a single RF channel.

Figure 1B:
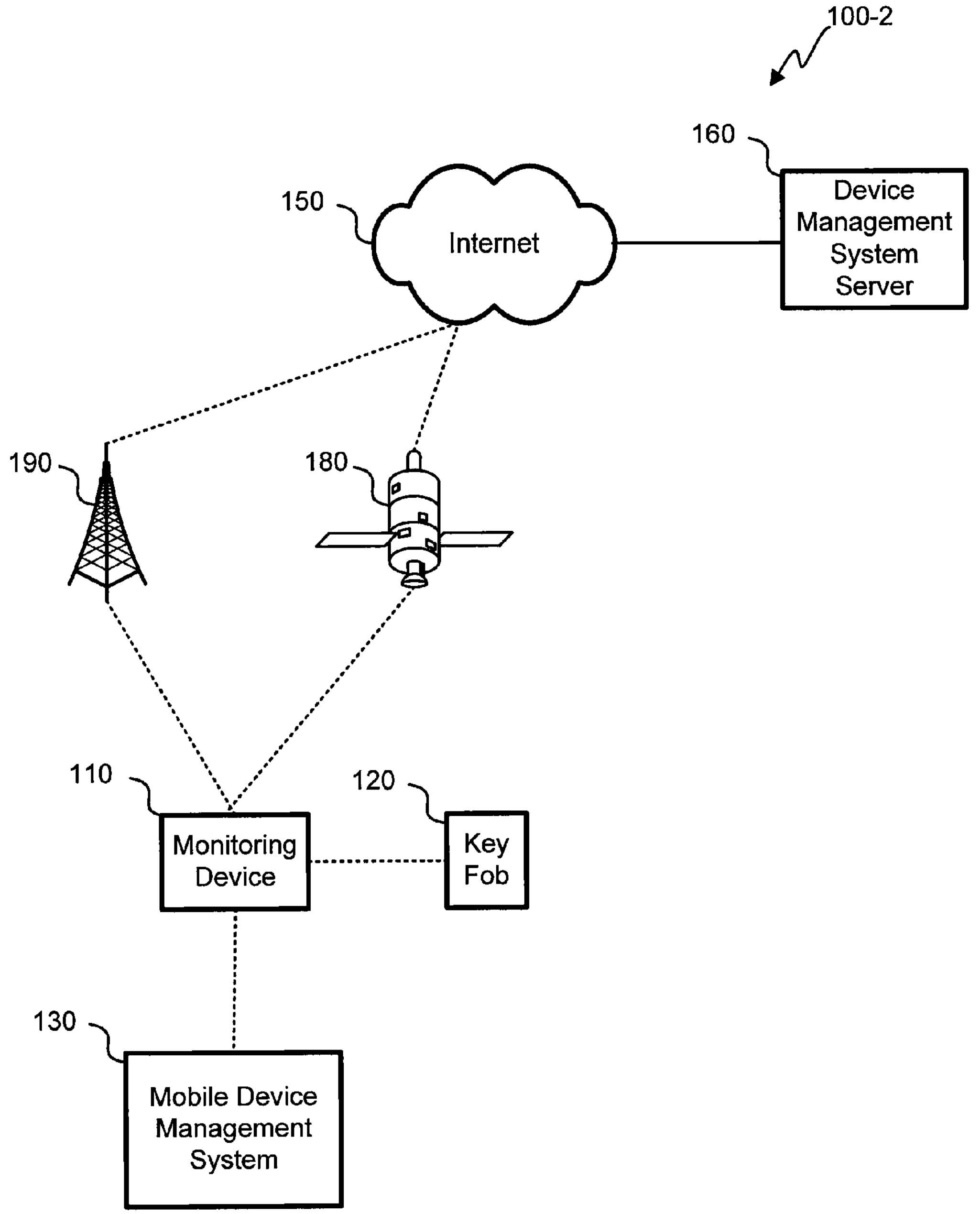
FIG. 1B is a block diagram of another embodiment of a wireless network for communicating configuration management data with a monitoring device from a mobile DMS.

FIG. 1B is a block diagram of an alternative embodiment of a configuration management system 100-2. In this embodiment, the monitoring device 110 can communicate with a mobile DMS 130. The mobile DMS 130 can perform some or all of the functions performed by the DMS server 160. The mobile DMS 130 and the monitoring device 110 can communicate wirelessly using any of the standards discussed above. The Mobile DMS 130 allows for further reconfiguration of the monitoring device in the field if, for example, communications with the satellite or mobile telephone systems 180 or 190 is impossible or requires a prohibitively large amount of battery power.

The mobile DSM 130 can be, for example, a PDA, a cellular telephone, a satellite telephone or a laptop computer. The mobile DSM 130 can use a short range wireless system such as Bluetooth, Zigbee (IEEE 802.15.4), infrared, UWB, and/or WiFi to communicate with the monitoring device 110. In one embodiment, the mobile DSM 130 is an RFID (e.g., ISO/IEC 14443) reader that powers at least a portion of the monitoring device 110 with an inductive power signal. The mobile DSM 130 uses public and/or private keys to authorize and authenticate a communication channel with the monitoring device 110. Once a cryptographically-secure communication channel is configured, communication of commands and data through the communication channel can be performed.

Figure 2:
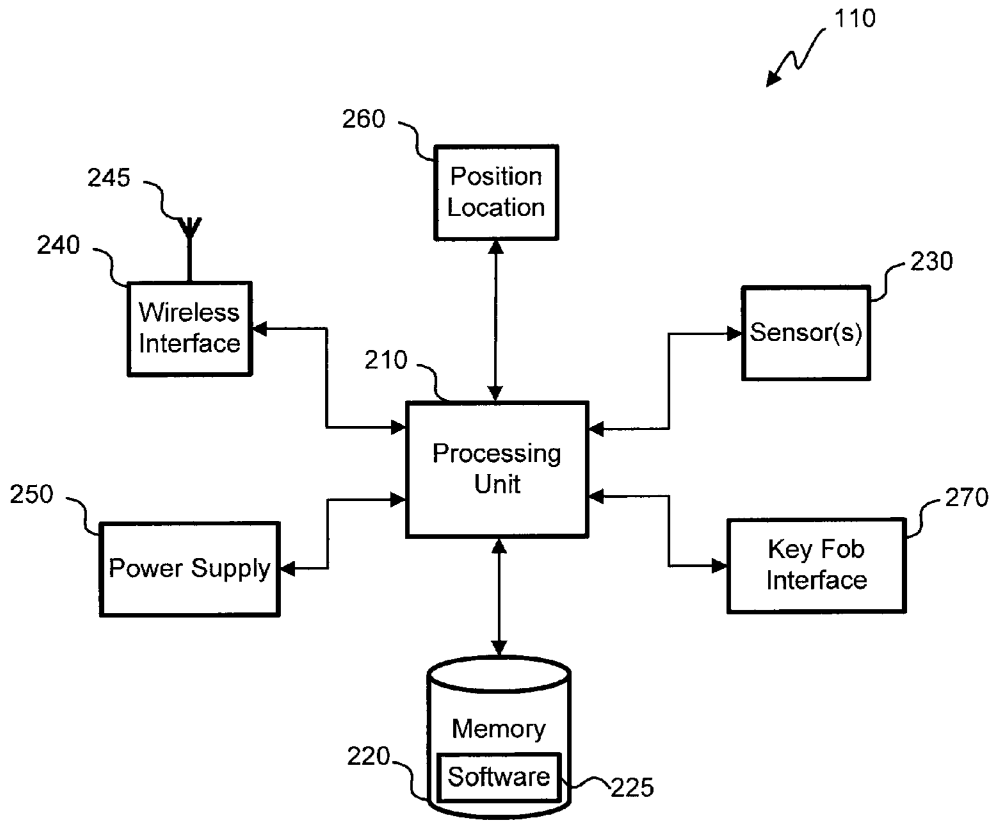
FIG. 2 is a block diagram of an embodiment of a monitoring device.

FIG. 2 is a block diagram of an embodiment of a monitoring device 110. This embodiment includes components including sensor(s) 230, a processing unit 210, memory 220 storing software 225, a power supply 250, a wireless interface 240, a position location module (e.g., a Global Positioning System or other position location device) 260 and a key fob interface 270. The wireless interface 240 can include one or more wide area network or WAN radios and one or more local area network or LAN radios. LAN radios of the wireless module can include one or more of WiFi (IEEE 802.11 standards), Bluetooth, or Zigbee (802.15.4), whereas WAN radios can include cellular (e.g., CDMA, TDMA, GSM, etc.), RFID, satellite (e.g., Comsat or Iridium), and/or infrared transceivers.

The processing unit 210 is a programmable device, e.g., a central processing unit (CPU), such as those made by Intel® Corporation or AMD®, a microcontroller, an application specific integrated circuit (ASIC), a field programmable gate array (FPGA), and/or logic gates etc. The memory 220 includes random access memory (RAM) and/or read-only memory (ROM). The memory 220 stores a computer program product comprising computer-readable, computer-executable software code 225 containing instructions that are configured to, when executed, cause the processing unit 210 to perform various functions described herein. Alternatively, the software 225 may not be directly executable by the processing unit 210 but configured to cause the processing unit 210, e.g., when the instructions are compiled and executed, to perform the functions described. The memory 220 can include persistent storage used to store serial number lists, and/or sensor data received from sensor modules associated with a shipping container or other cargo that the monitoring device is securing.

The sensors 230 can include passive sensors or active sensors. Passive sensors require no power to sense and record a change in a condition and can be analyzed/queried at a later date to determine if the condition has changed. The passive and active sensors could be located inside the monitoring device 110, on the outside of the shipping container, on the inside of the shipping container, and/or attached to the cargo. Active sensors require a power source and detect changes continually or intermittently. Active sensors can be battery powered, powered from the container, powered with a wire from the power supply 250, and/or wirelessly powered using RF fields supplied by a wireless power signal.

The power supply 250 includes one or more batteries. During normal operating conditions, power is supplied, directly or indirectly (e.g., via the processing unit 210) to the various modules of the monitoring device 110 from the power supply 250. The power supply 250 can also include one or more backup batteries as well as an inductive power supply. The inductive power supply is configured to receive a wireless power signal from an external source, such as the mobile DSM 130.

It can also be noted that the monitoring device 110 can include an interface (not shown) to provide a user with information. Such an interface can comprise a liquid-crystal display (LCD), one or more light emitting diodes (LEDs), etc.

The position location module 260 provides a location of the monitoring device 110 to the processing unit 210. The position location module 260 can be a GPS receiver. A GPS receiver is configured to receive signals, via a GPS antenna (not shown), from a plurality of GPS satellites in order to determine the global location of the monitoring device 110. Instead of, or in addition to GPS, other types of navigation systems such as GLONASS (Russia), Galileo, Beidou (China), WiFi assisted location systems, and/or cellular (e.g., GSM, CDMA, TDMA) based location systems can also be used.

The key fob interface 270 can be a wired or wireless interface, depending on the type of key fob 120 that the monitoring device 110 communicates with via the key fob interface 270. Wireless key fob interfaces include RFID, Bluetooth, Zigbee (IEEE 802.15.4), infrared, UWB, and/or WiFi. A wired key fob interface can include three wire leads, a ground, a key fob presence detect wire and a data wire. The key fob presence detect wire can receive a power signal from a capacitive resister of the key fob 120. The power signal wakes up the monitoring device 110 such that the power supply 250 of the monitoring device 110 can supply power to a microchip of the key fob 120. The serial number and action data stored on the key fob 120 is then communicated to the processing unit 210 via the data wire of the key fob interface 270.

Figure 3:
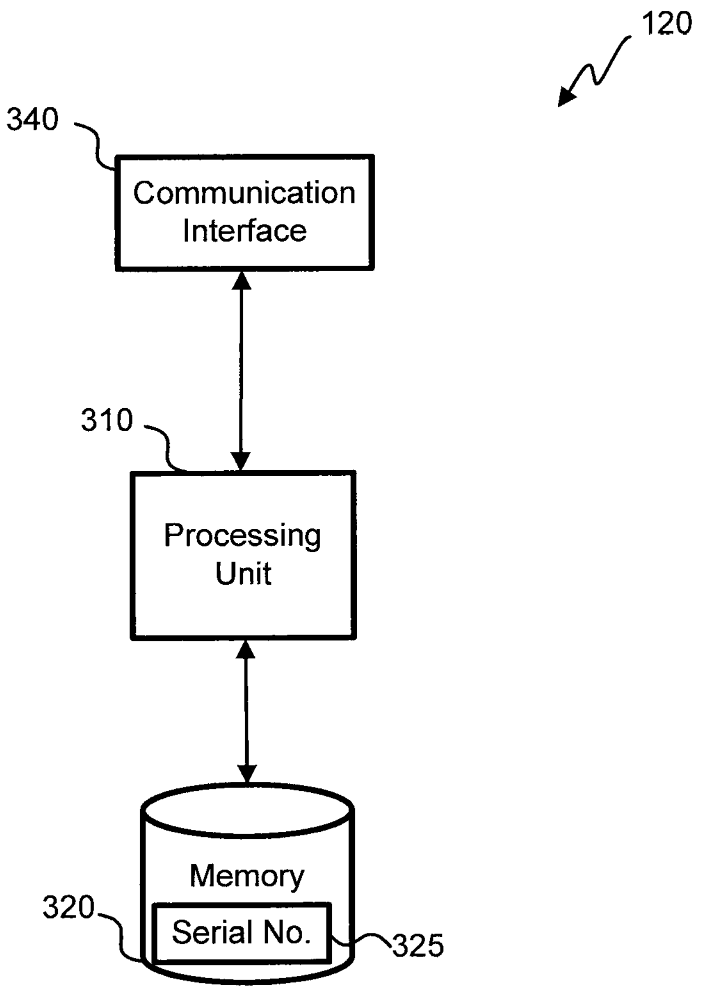
FIG. 3 is a block diagram of an embodiment of a key fob for communicating with a monitoring device to perform configuration management.

FIG. 3 is a block diagram of an embodiment of the key fob 120. The key fob 120 includes a processing unit 310, a non-volatile memory 320 storing data 325 including the serial number and any action data, and a communication interface 340. The processing unit 310 can be an application specific integrated circuit (ASIC), a field programmable gate array (FPGA), and/or logic gates etc. The memory 320 includes random access memory (RAM) and/or read-only memory (ROM). The memory 220 stores data including a serial number to be associated with the key fob 120, or encrypted data that when decrypted represents the serial number, and data representing actions to be taken by the monitoring device 110 when permitted.

The communication interface 340 is configured to support communication between the processing unit 310 of the key fob 120 and the processing unit 210 of the monitoring device 110. The communication interface 340 can be a wired or wireless communication interface. A wireless communication interface 340 can include an antenna and a wireless interface such as one or more local area network or LAN radios. LAN radios of the communication interface 340 can include one or more of WiFi (IEEE 802.11 standards), Bluetooth, or Zigbee (802.15.4). A wired interface can be as simple as an outer surface of a stainless steel (or other metal) can that the processing unit is mounted within, where the can includes a top portion acting as the data contact and the processing unit 310 is mounted on the lower portion of the can that acts as the ground contact.

Different key fobs 120 can be configured to cause the monitoring device 110 to perform different actions. In one embodiment, a command vector stored in the memory 320 indicates to the monitoring device 110 what action or actions are to be taken when a monitoring device 110 encounters a valid key fob 120. Each bit in the command vector is assigned a value of one or zero. A value of one indicates that the action associated with that bit should be performed by the monitoring device 110 if the key fob 120 has been verified as being valid for the monitoring device 110. A value of zero indicates that the action associated with that bit is not to be performed by the monitoring device 110. Table 1 lists an exemplary 32 bit command vector and the associated actions that a key fob 120 can store in the memory 320.

TABLE 1

| Bit No. | Action Name | Action Description |
|---|---|---|
| 0 | Power On | Turns the unit on |
| 1 | Arm | Puts the unit into active monitoring mode |
| 2 | Disarm | Takes the unit out of active monitoring mode |
| 3 | Test mode | Puts the unit in a mode such that diagnostic tests can be performed. |
| 4 | Power off | Turns the unit off |
| 5 | System test | Causes the unit to perform diagnostic tests |
| 6 | Maintenance | Causes the unit to send a message requesting maintenance |
| 7 | End of trip | Causes the unit to send a message signaling that the destination is reached |
| 8 | Delayed report | Causes unit to send a sensor status report a set time after receipt of the command |
| 9 | Delayed power off | Turns the unit off a set time after receiving the command |
| 10 | Start trip | Causes the unit to send a message signifying the beginning of a trip |
| 11 | Idle off | Puts the unit into a sleep mode |
| 12 | Idle on | Takes the unit out of a sleep mode and return to the previous mode |
| 13 | Quick start | Cause the unit to skip some normal turn-on self tests |
| 14 | Startup message | Causes the unit to send a message indicating that the unit has started a trip |
| 15 | Powered mode enabled | Enables external (non battery) powered mode |
| 16 | Powered mode disabled | Enables external (non battery) powered mode |
| 17 | Test Cycle | Causes the unit to send transmit messages using all wireless interface radios |
| 18 | Nap | Causes the unit to go to sleep for a set period of time and then rearm |
| 20 | Bootloader | Puts the unit into a mode such that new software code can be downloaded |
| 21 | Load Config 1 | Loads the unit with pre-stored configuration #1 |
| 22 | Load Config 2 | Loads the unit with pre-stored configuration #2 |
| 23 | Load Config 3 | Loads the unit with pre-stored configuration #3 |
| 24 | Load Config 4 | Loads the unit with pre-stored configuration #4 |
| 24 | Load Config 5 | Loads the unit with pre-stored configuration #5 |
| 25-31 | (unused) | future use |

Figure 4:
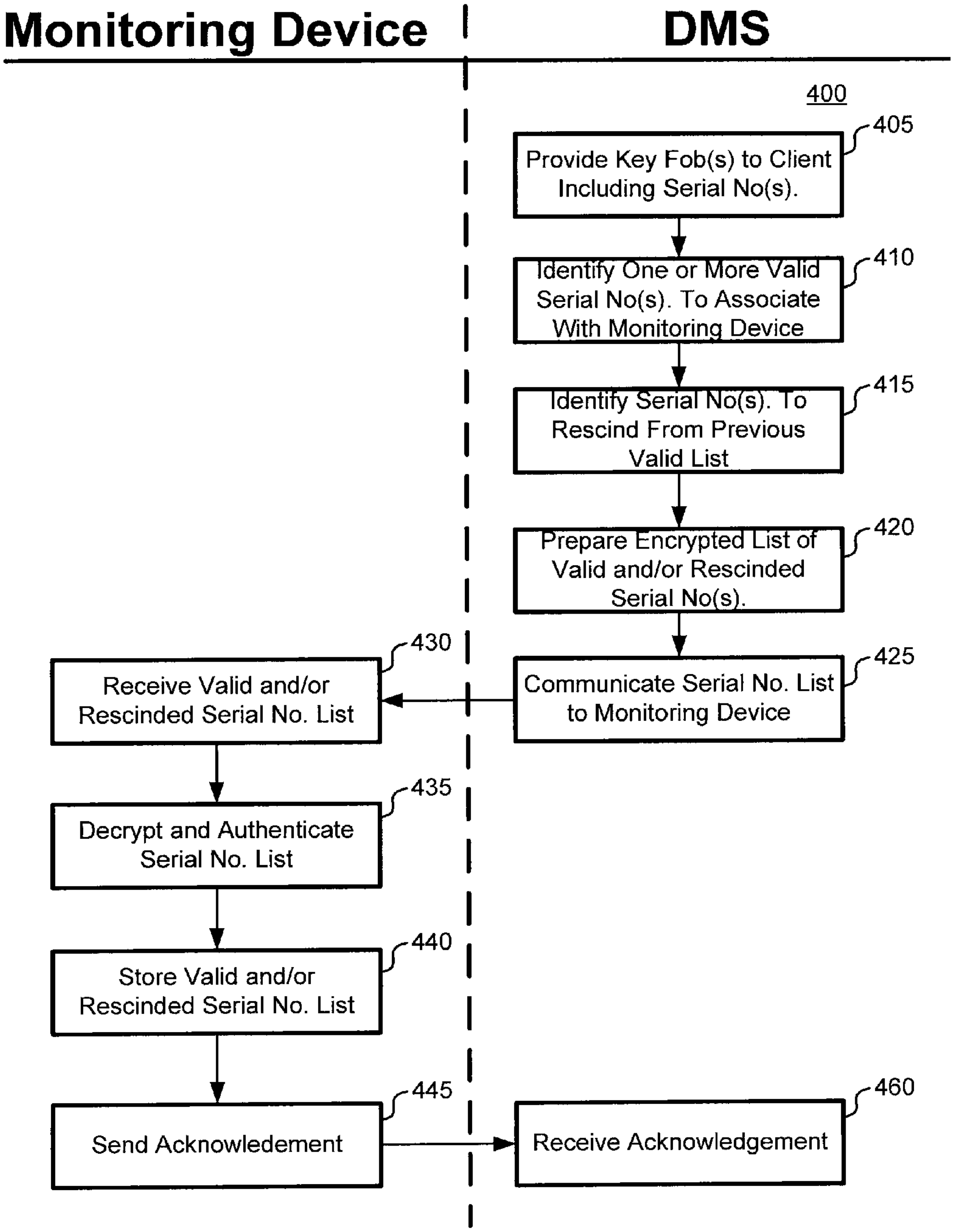
FIG. 4 is a swim-lane diagram illustrating one embodiment of a method for exchanging configuration management data with a monitoring device.

FIG. 4 is a is a swim-lane diagram illustrating one embodiment of a method 400 for exchanging configuration management key fob serial numbers between a monitoring device 110 and a DMS (e.g., the DMS server 160 and/or the mobile DMS 130). The process 400 can be initiated by the monitoring device or by the DMS. If a user wakes up the monitoring device by inserting a key fob 120 into the key fob interface 270 and the serial number of the key fob 120 is not stored in the valid key fob list or not stored in the rescinded serial number list, then the monitoring device can transmit a signal to the DMS to start the process 400. Alternatively, the DMS can initiate the process 400 if a new serial number is to be added to the valid serial number list or to the rescinded serial number list. The monitoring device can wake up periodically, or can be awakened by the DMS. The DMS can transmit a call back command message to the monitoring device that causes the monitoring device to initiate transmission of a message upon waking up and receiving the call back message.

Regardless of how the process 400 is initiated, at block 405, the DMS provides one or more key fobs to a client where each key fob stores a serial number. Upon providing the key fobs 120 to the client the process 400 proceeds to block 410 where the DMS identifies which serial numbers will be valid serial numbers for a given monitoring device. Each monitoring device is assigned an identification number and the valid serial numbers are stored at the DMS in association with the identification number of the monitoring device. Each key fob 120 serial number can be valid for one or more monitoring devices.

If a serial number is to be rescinded from a valid list already stored in a monitoring device, the process 400 proceeds to block 415 where the DMS identifies any serial numbers of key fobs that are to be rescinded from a stored valid list. A key fob serial number can be rescinded if a user of the key fob has lost the key fob, or if the key fob was stolen. Alternatively, the DMS could identify a key fob serial number that has been linked to unusual activity at a monitoring device. Unusual activity could include powering down a monitoring device before a final destination is reached, for example.

The valid or rescinded serial numbers can include data indicative of a range of sequential serial numbers associated with a plurality of key fobs. For example, if the serial numbers are represented by 64 bits, on value of the 60 most significant bits could represent a range of 16 serial numbers.

Upon identifying valid serial numbers at block 410 and or identifying serial numbers to be rescinded at block 415, the process 400 continues at block 420 where the DMS prepares an encrypted list of valid serial numbers to be added to and/or serial numbers to be rescinded from the memory of a monitoring device. The encryption can employ a private/public authentication scheme. The key fobs 120 can store an encrypted version of the serial number and the monitoring device can verify the serial number as being authentic using a public key associated with the key fob 120.

At block 425, the encrypted serial number list is communicated to the monitoring device. The communication can be over one or more wired and/or wireless networks such as the Internet, satellite and/or mobile telephone systems. The encrypted serial number list can be communicated with a checksum that is used to verify the integrity of the serial number list received by the monitoring device. At block 430, the monitoring device receives the encrypted serial number list. At block 435, the monitoring device decrypts and authenticates the received serial number list including valid and/or rescinded serial numbers. Upon authenticating the serial number list, the process 400 continues at block 440 where the monitoring device stores the serial number list into memory such as the memory 220 of FIG. 2.

If the authentication performed at block 435 indicates that the serial number list was properly received, the monitoring device sends an acknowledgment (ACK) message to the DMS at block 445, the ACK message indicating that the serial number list was properly received. If the serial number list was not properly received the monitoring device could send a negative acknowledgment (NAK) message to the DMS at the block 445. At block 460, the DMS receives the ACK or NAK message. If an ACK message is received at block 460, the process 400 terminates. If a NAK message is received, the process 400 returns to block 425 to communicate another serial number list from the DMS to the monitoring device.

The process 400 is exemplary only and not limiting. The process 400 can be altered, e.g., by having blocks added, removed, or rearranged. For example, block 410 or block 415 described above for identifying valid serial numbers to add to a monitoring device or identifying serial numbers to rescind from a monitoring device can be omitted. Still other alterations to the process 400 as shown and described are possible.

Figure 5A:
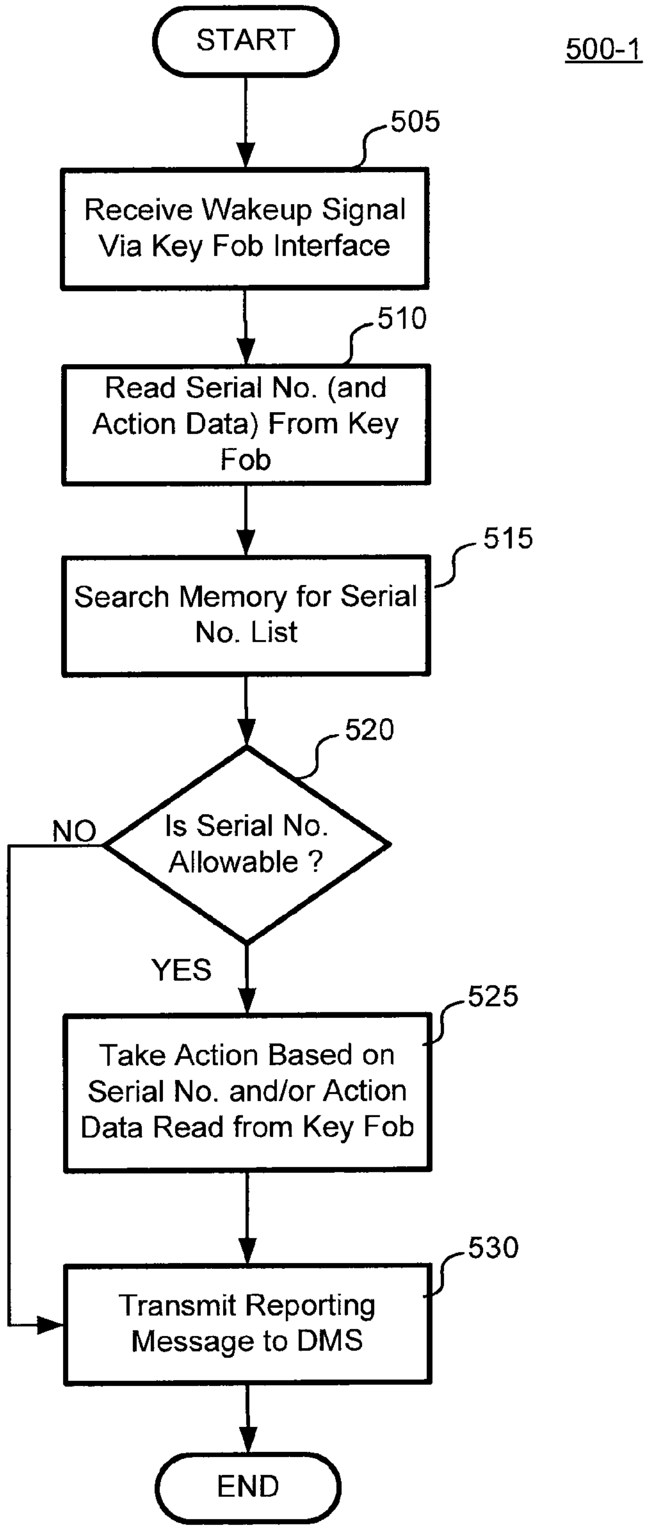
FIG. 5A is a flow chart illustrating an example of a method for performing configuration management with a monitoring device.

FIG. 5A is a flowchart illustrating an example of a process 500-1 for performing configuration management with a monitoring device. With further reference to FIG. 2, the process 500-1 begins at block 505 with the processing unit 210 of the monitoring device 110 receiving a wakeup signal via the key fob interface 270. The monitoring device 110 can be in various sleep states with different components being powered or not. The wakeup signal can be produced by a capacitive resistor of the key fob 120 illustrated in FIG. 3 when the key fob 120 contacts the ground and signal detect wires of the key fob interface 270.

Upon receiving the wakeup signal, the processing unit 210, at block 510, reads the serial number from the key fob 120. The serial number data stored on the key fob 120 can be encrypted. In addition to reading the serial number at block 510, data related to actions to be taken in response to verifying that the key fob 120 is a valid key fob 120 can also be read from the key fob 120 at block 510. The action data can be a bit field such as the 32 bit vector illustrated in Table 1 above. The action data can also be encrypted.

At block 515, the processing unit 210 searches the serial number list stored in the memory 220. The stored serial number list can include valid serial numbers and/or rescinded serial numbers. The serial numbers can be stored in encrypted form. At decision block 520, the processing unit 210 determines if the serial number read from the key fob 120 is an allowable serial number, as indicated by being in the valid serial number list, and/or not included in a rescinded serial number list. If the processing unit 210 determines that the read serial number is allowable, the process 500-1 continues at block 525 where the processing unit 210 causes the modules of the monitoring device 110 to perform actions as determined by the read serial number and/or the read action vector data. For example, if one or more of the bit fields in the 32 bit command vector of Table 1 is equal to one, the processing unit will cause the monitoring device 110 to take the associated action(s).

In one embodiment, the key fob 120 stores an unencrypted version of the serial number and an encrypted version of the serial number. The processing unit 210 reads the unencrypted serial number and the encrypted serial number at block 510. The processing unit 210 decrypts the encrypted serial number with a key stored in the memory 220 to form a decrypted serial number. The processing unit 210 then compares the decrypted serial number and the unencrypted serial number at block 520 to further verify that the key fob 120 is valid and not a copy or forgery.

Upon taking the actions at block 525, the process 500-1 proceeds to block 530 where the processing unit causes the wireless interface 240 to transmit a reporting message to the DSM. The reporting message can be a result of the action data to be taken at block 525 or, alternatively, to report the key fob serial number to the DSM. For example, if bit number 11 of the command vector of Table 1 is set equal to one, the processing unit 210 will put the monitoring device into sleep mode.

If the processing unit 210 determines that the read serial number is not valid or is included in the rescinded list, the process 500-1 continues at block 530 where the processing unit 210 causes the wireless interface 240 to transmit a message to the DMS. In the case where the serial number was determined to be invalid, the reporting message can include an identification number of the monitoring device 110 and the serial number of the key fob 120. In addition, the reporting message could include states of the sensors 230, the location of the monitoring device 110 as determined by the position location module 260 and other pertinent data. In one embodiment, the message transmitted at block 530 causes an email message to be communicated to the holder of the key fob 120 that awakened the monitoring device 110. In this way, the user of the key fob 120 can be alerted if someone else found and used the key fob 120 to communicate with the monitoring device 110.

The process 500-1 is exemplary only and not limiting. The process 500-1 can be altered, e.g., by having blocks added, removed, or rearranged.

Figure 5B:
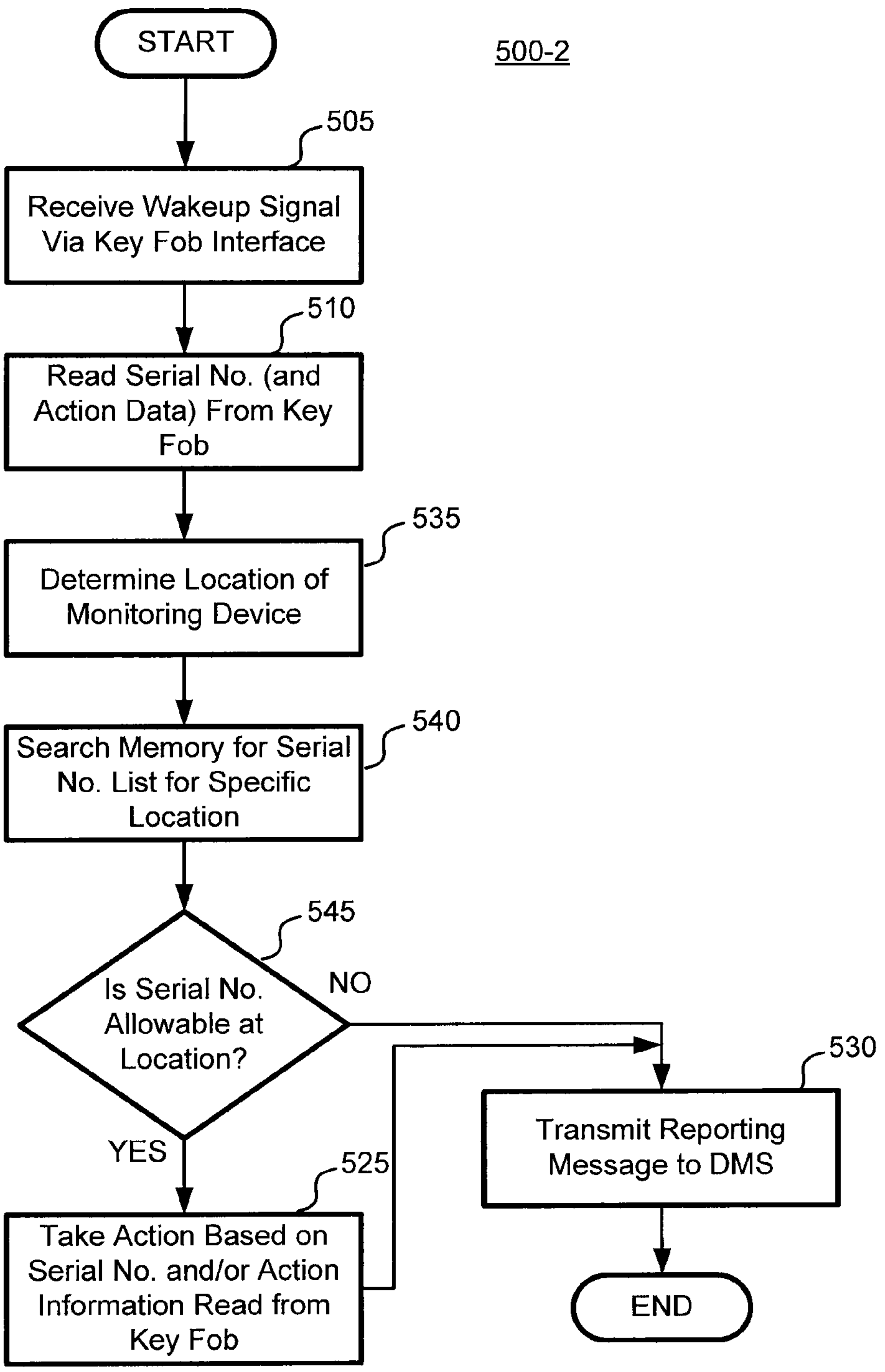
FIG. 5B is a flow chart illustrating another example of another method for performing configuration management with a monitoring device.

FIG. 5B is a flowchart illustrating an example of a process 500-2 for performing configuration management with a monitoring device 110. The process 500-2 is similar to the process 500-1 discussed above. However, the process 500-2 uses a sensed location of the monitoring device 110 to determine which key fob 120 serial numbers are valid. The monitoring device 110 stores the valid and/or rescinded serial numbers in the serial number list in association with geographic location data. Depending on the geographic location (e.g., specified latitudes and longitudes) in which the monitoring device 110 is located, the serial number list can indicate different valid serial numbers. By limiting certain key fobs 120 to be valid in limited geographic areas, the DSM can control which actions, as determined by data stored on the key fob, can be performed in which areas. For example, if the device is determined to be at sea, a certain set of serial numbers could be assigned only to people that would be on a ship at sea.

With further reference to FIG. 2, the blocks 505 and 510 are the same as the blocks 505 and 510 discussed in reference to the process 500-1. At block 535, the processing unit 210 receives data indicative of the location of the monitoring device 110 from the position location module 260 and determines the location of the monitoring device 110 based on the received data. At block 540, the processing unit 210 searches the serial number list(s) stored in memory to identify if the serial number received at block 510 is a valid serial number associated with a location that matches, or matches within a threshold distance, the determined location. At decision block 545, the processing unit 210 determines if the received serial number is valid at the determined location. If the received serial number is valid, the process continues to block 525 where the monitoring device performs actions as determined by action data stored on the key fob 120 and read at block 510. If the received serial number is not valid at the determined location, the process continues to block 530. The function performed at the blocks 525 and 530 are similar to those discussed above in references to the process 500-1.

The process 500-2 is exemplary only and not limiting. The process 500-2 can be altered, e.g., by having blocks added, removed, or rearranged.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-readable instructions, which may be used to cause a machine, such as a general-purpose or special-purpose processor or logic circuits programmed with the instructions to perform the methods. These machine-readable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

While illustrative and presently preferred embodiments of the disclosed systems, methods, and devices have been described in detail herein, it is to be understood that the inventive concepts may be otherwise variously embodied and employed, and that the appended claims are intended to be construed to include such variations, except as limited by the prior art.

What is claimed is:

1. A monitoring device configured to monitor cargo, the monitoring device comprising:
- a key fob interface configured to:
  - communicate with an external key fob configured to temporarily interface with the monitoring device by providing the monitoring device with action data indicative of an action to be performed and a serial number that indicates a key fob credential status; and
  - generate a wake up signal when communicating with a key fob;
- a memory configured to store a serial number list that includes at least one valid serial number associated with one or more key fobs permitted to interface with the monitoring device;
- a processing unit coupled to the key fob interface and the memory, the processing unit configured to:
  - receive a wakeup signal generated by the key fob interface,
  - access, via the key fob interface, a serial number and action data provided by a key fob;
  - determine whether a serial number provided by a key fob is valid or invalid by reviewing the serial number list; and
  - control the monitoring device in accordance with accessed action data in response to determining that a serial number provided by a key fob is valid.

2. The monitoring device of claim 1, wherein the serial number list further includes data indicative of at least one rescinded serial number associated with one or more key fobs that are not permitted to interact with the monitoring device.

3. The monitoring device of claim 1, wherein the serial number list further includes data indicative of a range of sequential serial numbers associated with a plurality of key fobs that are permitted or are prohibited from interfacing with the monitoring device.

4. The monitoring device of claim 1, wherein the processing unit is further configured to:

access an encrypted serial number provided by the key fob; and decrypt an encrypted serial number provided by the key fob.

5. The monitoring device of claim 1, further comprising a wireless interface, and wherein the processing unit is further configured to cause the wireless interface to receive data indicative of a serial number to add to the stored serial number list.

6. The monitoring device of claim 1, wherein the processing unit is further configured to access action data that indicates one or more actions to be performed by the monitoring device, the one or more actions including at least one of arming the monitoring device, powering on the monitoring device, causing the monitoring device to test one or more modules of the monitoring device, powering off the monitoring device or disarming the monitoring device.

7. The monitoring device of claim 1, wherein the processing unit is further configured to cause the wireless interface to transmit a message to a remotely located communications entity when the processing unit identifies an invalid serial number.

8. The monitoring device of claim 7, wherein controlling the monitoring device includes causing the monitoring device to transmit a message to a remote location.

9. The monitoring device of claim 1, further comprising:

a position location module coupled to the processing unit, wherein the serial number list includes location data indicative of a location where certain serial numbers are permitted or not permitted to interface with the monitoring device, and wherein the processing unit is further configured to:

determine a location of the monitoring device based on data received from the position location module, and determine that the stored location data matches the determined location.

10. The monitoring device of claim 1, wherein the monitoring device is further configured to access action data that is encrypted and the memory is further configured to store a key to decrypt the action data.

11. A method performed at a monitoring device, wherein the monitoring device includes a key fob interface and is configured to monitor cargo and interface with an external key fob, the method comprising:

storing a serial number list in memory, the serial number list indicating at least one valid serial number associated with one or more key fobs permitted to interface with the monitoring device;

accessing a wakeup signal generated by the key fob interface while the key fob interface detects a key fob, accessing, via the key fob interface, a serial number provided by the key fob;

accessing action data provided by the key fob, the action data indicating an action to be taken by the monitoring device; and determining that the accessed serial number is valid by reviewing the serial number list; and in response to determining that the accessed serial number is valid, performing the action indicated by the action data.

12. The method of claim 11, wherein the serial number provided by the key fob is encrypted, and wherein the method further comprises decrypting the serial number provided by the key fob.

13. The method of claim 11, further comprising:

receiving, via a wireless interface, data indicative of an additional serial number; and adding the additional serial number to the stored serial number list.

14. The method of claim 11, wherein the action data is associated with one or more actions to be performed by the monitoring device, the one or more actions including at least one of arming the monitoring device, powering on the monitoring device, causing the monitoring device to test one or more modules of the monitoring device, powering off the monitoring device or disarming the monitoring device.

15. The method of claim 11, further comprising:

determining that an accessed serial number does not match any serial number in the serial number list; and transmitting a message, via a wireless interface, to a remote location.

16. The method of claim 11, wherein performing the action indicated by the action data includes transmitting a message via a wireless interface to a remote location.

17. The method of claim 11, wherein:

the serial number list includes location data indicative of a location where certain serial numbers are permitted or not permitted to interact with the monitoring device, and wherein the method further comprises:

determining a location of the monitoring device based on received data; and determining that the stored location data matches the determined location.

18. The method of claim 11, wherein the action data associated with one or more actions to be performed by the monitoring device is encrypted and the memory stores a key to decrypt the action data, and wherein the method further comprises decrypting the action data using the stored key.

* * * * *